United States Patent
Terranova (10) Patent No.: US 11,153,247 B1
(45) Date of Patent: Oct. 19, 2021

(54) EFFORT MANAGEMENT EMAIL SYSTEM

(71) Applicant: Francesco Terranova, Cabo Rojo, PR (US)

(72) Inventor: Francesco Terranova, Cabo Rojo, PR (US)

( * ) Notice: Subject to any disclaimer, the term of this patent is extended or adjusted under 35 U.S.C. 154(b) by 0 days.

(21) Appl. No.: 17/323,341

(22) Filed: May 18, 2021

(51) Int. Cl.
*H04L 12/58* (2006.01)

(52) U.S. Cl.
CPC .............. *H04L 51/18* (2013.01); *H04L 51/22* (2013.01); *H04L 51/26* (2013.01)

(58) Field of Classification Search
CPC ....... H04L 51/18; H04L 51/22; H04L 67/322; H04L 67/025; H04L 67/34; H04L 43/08; H04L 65/80
See application file for complete search history.

(56) References Cited

U.S. PATENT DOCUMENTS

| | | | | |
|---|---|---|---|---|
| 7,305,441 | B2 * | 12/2007 | Mathewson, II | G06Q 10/107 709/206 |
| 8,117,263 | B2 * | 2/2012 | Malik | G06Q 10/107 709/206 |
| 9,654,435 | B2 * | 5/2017 | Kim | H04L 51/34 |
| 2010/0076989 | A1 * | 3/2010 | Jakobson | G06Q 10/00 707/758 |
| 2010/0220842 | A1 * | 9/2010 | Thenthiruperai | H04M 3/5166 379/88.04 |
| 2015/0007048 | A1 * | 1/2015 | Dumans | G06F 3/04817 715/752 |
| 2016/0277330 | A1 * | 9/2016 | Jawaharlal | H04L 51/18 |
| 2017/0324695 | A1 * | 11/2017 | Fischer | H04L 51/24 |

* cited by examiner

*Primary Examiner* — Sargon N Nano (57) ABSTRACT

An exemplary effort management email system includes a database and a calculation module. The database includes a standard email dataset and a supplementary email dataset. The supplementary email dataset requires a sender to provide an estimate of the effort needed on the part of the recipient to reply or otherwise deal with the sender's email message. The calculation module includes an expected response module, a streamlining module, an alert module, and an effort management module. The expected response module processes the supplementary email dataset, and configures user interface email displays for senders and recipients of emails, including interactive displays. The streamlining module organizes incoming email information regarding individual recipients, and configures user interface email displays for recipients to readily see their overall email inbox situation. The effort management module records, compiles, analyzes and reports on information on all emails of all senders and recipients of an organization.

17 Claims, 13 Drawing Sheets

EFFORT MANAGEMENT EMAIL SYSTEM

BACKGROUND

Field of the Invention

The present invention relates to electronic mail (email) systems and methods, and more specifically, to managing the effort required of users of an email system when responding to incoming emails.

Description of Related Art

An email system is perhaps the most efficient and convenient means of communication in an organization.

Studies have shown that employees perform at their highest level of productivity when allowed to deep focus on their current task. Focusing mental activity maximizes a person's concentration and performance on a specific task, with the person not being distracted by environmental disturbances such as phone calls, background noises, social networking applications and constant email mailbox interaction. Specifically, the tasks of manually awaiting, browsing, sorting, reviewing and organizing an electronic mailbox and its messages may consume a large part of someone's work day.

For typical employees, a major component of communication is messages transmitted through email from one user (a "sender") to another (a "recipient"). One conventional email protocol employed over the Internet is Simplified Mail Transfer Protocol ("SMTP"). SMTP mandates that each email message body have a header that includes the sender's email address (a "source address" or a "return address") and the recipient's email address (a "destination address").

When a user sends an email routed to a recipient, the recipient is usually unaware of the content of the email at the time of its arrival. In particular, the recipient is unaware whether the email will necessitate any written response, what type of response (if any) might be required, how much effort will be required in handling of the email, whether the email contains a deadline, or whether the email involves any executive or upper management authority.

Depending on the type and size of an organization, a team member can receive over 1,000 emails a day. Typically, only a few actually require immediate attention by the recipient, and even fewer his/her urgent intervention. Rather, the majority of incoming emails in someone's inbox may be just informative or include secondary requests that could be processed at a later time of the day or even in following days. Nevertheless, the team member through the course of a day may have to constantly review a list of hundreds if not thousands of unread email messages.

Standard email systems allow a recipient to customize his/her mailbox in order to streamline the queue of incoming email messages. Tools can include automatic routing of emails to certain folders, manual colorization of high priority emails, or even sophisticated methodology to automatically sort high importance emails.

The main disadvantage of standard email systems is that in order to perform a comprehensive streamlining process of someone's electronic mailbox, they rely solely on information currently collected and stored in the email system platform. In particular, standard email systems rely on a dataset including the sender's name, the receipt date and time, the email's keywords, the subject of the email, the email body itself, and so on. Therefore, in most of cases the mailbox owner's intervention is needed to make sense of the ever-present clutter.

Furthermore, standard email systems do not provide real-time detailed high-level views of electronic mailbox messages, thus obliging users to implement a one-by-one type of approach when searching for high-priority messages.

In the majority of organizations, the customization of an individual's electronic mailbox is possible. However, this option is usually left to the individual's initiative, because different departments, roles, team members and even personalities can have fundamentally different needs in terms of email sorting, prioritization and categorization. The result is that customization cannot be automated organization-wide; or if done, the customization is implemented to an unsatisfactory level.

Additional general background may be found in US Patent Application No. US 2002/0059381, the entirety of which is hereby incorporated herein by reference for all purposes.

Thus there is a need to overcome the shortcomings of the related art.

BRIEF SUMMARY

In a typical application, an organization employs an effort management email system of the present invention. The email system provides tracking, streamlining, managing and minimizing of effort required by users of an email system. The email system requires a sender of an email to provide an estimate of the effort needed on the part of the recipient of the email to reply or otherwise deal with the sender's email message. The estimate is information that is supplementary to the ordinary information of an email. That is, for each outgoing email, the email system processes a supplementary email dataset in addition to a standard email dataset. Furthermore, for all incoming emails to any given recipient, the email system uses algorithms leveraging the two datasets. The resulting calculation of all incoming emails for that recipient allows the recipient to instantly obtain a dashboard display showing a condensed, comprehensive, all-inclusive prioritization view of their email inbox. The email system also processes all supplementary email datasets and standard email datasets to produce real-time and historical reports of the estimated amount of the organization's user time spent in an email system.

An exemplary effort management email system of the present invention includes a database, a calculation module, an administration module, and a sending and receiving module. The database includes a standard email dataset and a supplementary email dataset. The email system is connected to a plurality of user computer terminals and electronic devices within an organization.

The calculation module includes an expected response module, a streamlining module, an alert module, and an effort management module. The expected response module carries out and controls all functions of the email system relating to processing the standard email dataset and supplementary email dataset, and configuring user interface email displays for senders and recipients of emails, including interactive displays. The streamlining module carries out and controls all functions of the email system relating to organizing incoming email information regarding individual recipients, and configuring user interface email displays for recipients to readily see their overall email inbox situation. The alert module carries out and controls all functions of the email system relating to timely alerting users of any need to check their email inbox immediately. The effort management module carries out and controls all functions of the email system relating to recording, compilation, analysis and reporting of information on all emails of all senders and recipients of the organization.

BRIEF DESCRIPTION OF THE DRAWINGS

The present invention will be described with reference to the accompanying drawings, which show aspects of embodiments of the present invention.

DETAILED DESCRIPTION OF EMBODIMENTS

The numerous innovative teachings of the present invention will be described with particular reference to currently preferred and exemplary embodiments (and not by way of limitation). Several embodiments are described, and nothing in the description below should be taken as limiting the claims.

For simplicity and clarity of illustration, the drawing figures illustrate the general manner of construction, and description and details of well-known features and techniques may be omitted. Additionally, elements in the drawing figures are not necessarily drawn to scale. For example, some areas or elements may be expanded to facilitate understanding of embodiments of the invention.

The terms "first," "second," and "third" and the like in the description may be used for distinguishing between similar elements, and are not necessarily for describing a particular sequential or chronological order. It is to be understood that the terms so used are interchangeable. Furthermore, the terms "comprise," "include" and "have," and any variations thereof, are intended to cover non-exclusive inclusions. Moreover, a process, method, article, apparatus or composition that comprises a list of elements is not necessarily limited to those elements, but may include other elements that are not expressly listed or are inherent to the process, method, article, apparatus or composition.

In a typical application, an organization employs an effort management email system of the present invention. The email system provides tracking, streamlining, managing and minimizing of effort required by users of an email system. The email system requires a sender of an email to provide an estimate of the effort needed on the part of the recipient of the email to reply or otherwise deal with the sender's email message. The estimate is information that is supplementary to the ordinary information of an email. That is, for each outgoing email, the email system processes a supplementary email dataset in addition to a standard email dataset. Furthermore, for all incoming emails to any given recipient, the email system uses algorithms leveraging the two datasets. The resulting calculation of all incoming emails for that recipient allows the recipient to instantly obtain a dashboard display showing a condensed, comprehensive, all-inclusive prioritization view of their email inbox. The email system also processes all supplementary email datasets and standard email datasets to produce real-time and historical reports of the estimated amount of the organization's user time spent in an email system.

The present invention provides a new approach to a typical organization's email system, and utilizes a new mandatory email dataset. Current email protocols of any particular organization do not need to be modified or compromised.

The present email system leverages the supplementary email dataset to present each email to each recipient in both aggregate and detailed forms, as described below.

Moreover, the present email system may be implemented as a customization of an organization's current email system. This is achieved by integrating an existing standard email dataset with the supplementary email dataset, and employing a novel display/interface simultaneously on the same display/interface of an ordinary email.

Information of the supplementary email dataset managed by the present email system focuses on the maximization of organizational productivity. Combining the supplementary email dataset with a standard email dataset enables the present email system to enjoy the features of an effort-focused email system.

Figure 1:
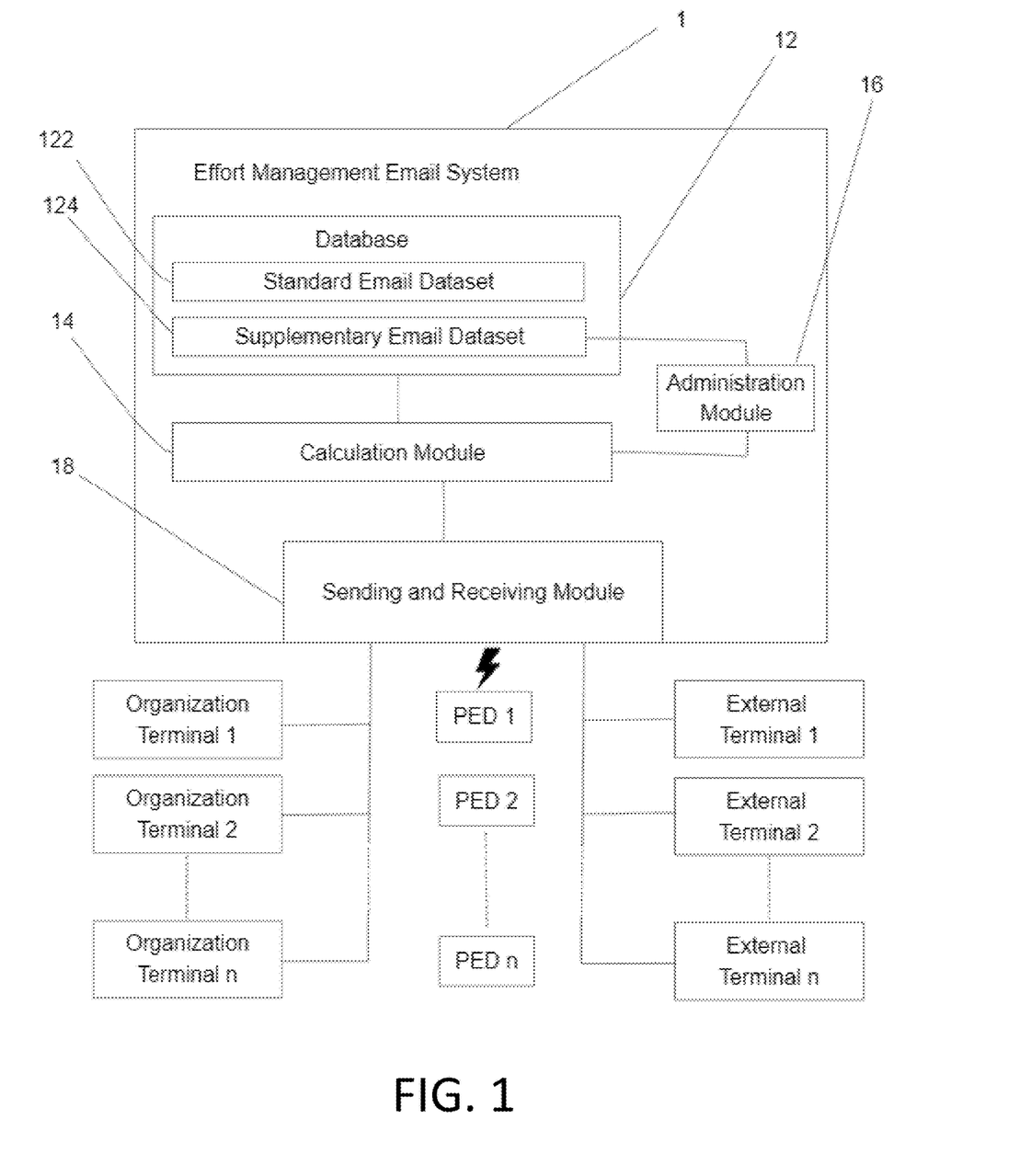
FIG. 1 is a schematic diagram of an effort management email system according to an exemplary embodiment of the present invention, showing a stand-alone implementation of the email system.

In reference to FIG. 1, an exemplary effort management email system 1 of the present invention can be a stand-alone email system 1. The stand-alone email system 1 can be fully integrated with and fully compatible with a standard email system used by an organization. The email system 1 includes a database 12, a calculation module 14, an administration module 16, and a sending and receiving module 18. The database 12 includes a standard email dataset 122 and a supplementary email dataset 124. The email system 1 is connected to a plurality of user computer terminals and electronic devices within the organization, and to a plurality of user computer terminals outside the organization.

Figure 2:
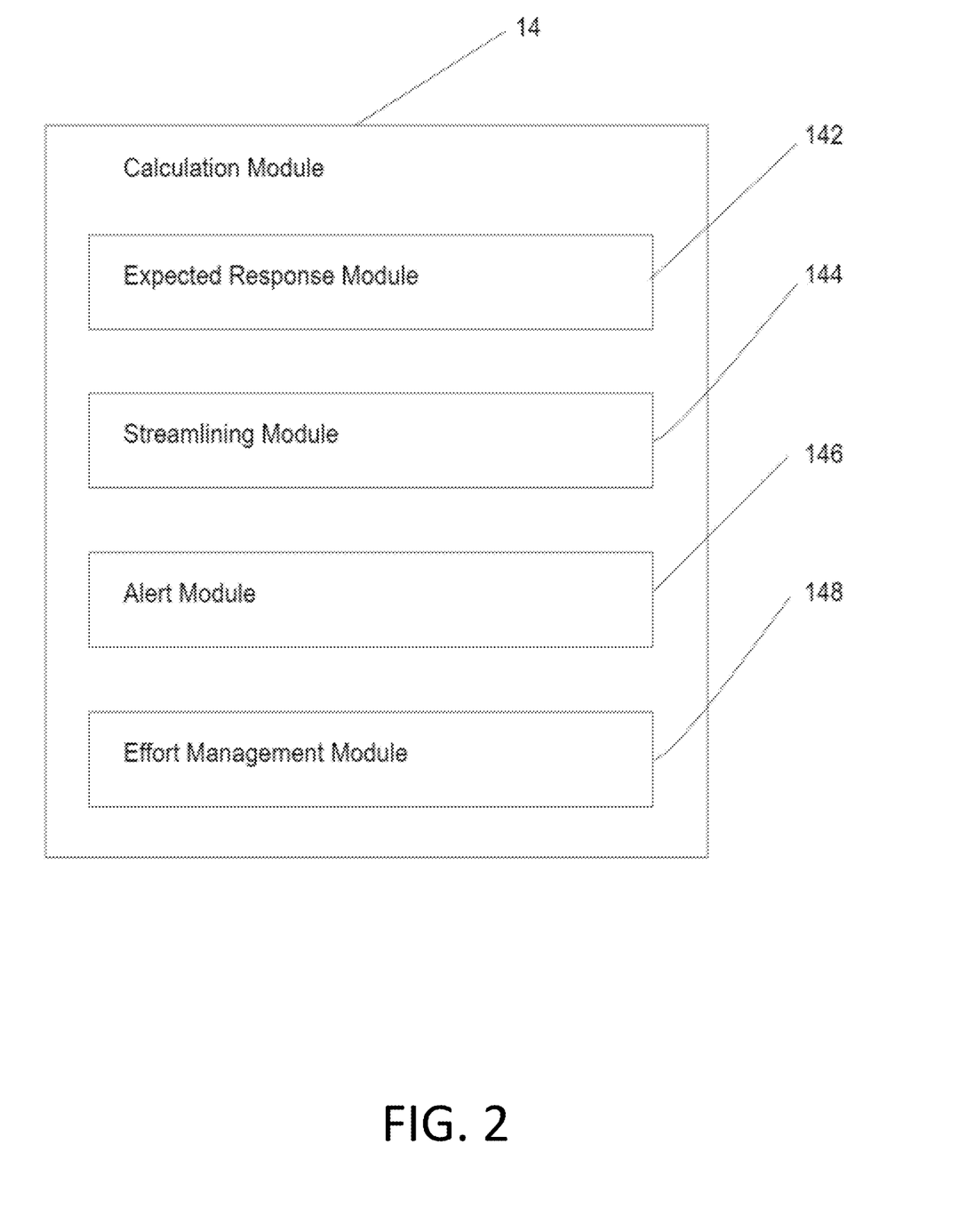
FIG. 2 is a schematic diagram of a calculation module of the effort management email system of FIG. 1.

Referring also to FIG. 2, the calculation module 14 includes an expected response module 142, a streamlining module 144, an alert module 146, and an effort management module 148. The expected response module 142 carries out and controls all functions of the email system 1 relating to processing the standard email dataset 122 and supplementary email dataset 124, and configuring user interface email displays for senders and recipients of emails, including interactive displays. The streamlining module 144 carries out and controls all functions of the email system 1 relating to organizing incoming email information regarding individual recipients, and configuring user interface email displays for recipients to readily see their overall email inbox situation. The alert module 146 carries out and controls all functions of the email system 1 relating to timely alerting users of any need to check their email inbox immediately. The effort management module 148 carries out and controls all functions of the email system 1 relating to recording, compilation, analysis and reporting of information on all emails of all senders and recipients of the organization.

The sending and receiving module 18 is the input/output component of the email system 1. In the illustrated embodiment, the sending and receiving module 18 communicates with other electronic devices by way of hardwired connections and wireless connections. The other devices are various computer terminals and portable electronic devices (PEDs) within the organization or outside the organization. For example, desktop computers, notebooks, laptops, tablets, smart phones, and smart watches. The wireless connections can be by way of Bluetooth® interconnection. The administration module 16 carries out all functions of customizing or tailoring the content of the supplementary email dataset 124 to suit the needs of a particular organization, and customizing or tailoring the functions of the calculation module 14 to suit the needs of the particular organization. In particular, the administration module 16 can customize any and all user interfaces of the email system 1.

Aspects of the expected response module 142 will now be described in detail.

Figure 3:
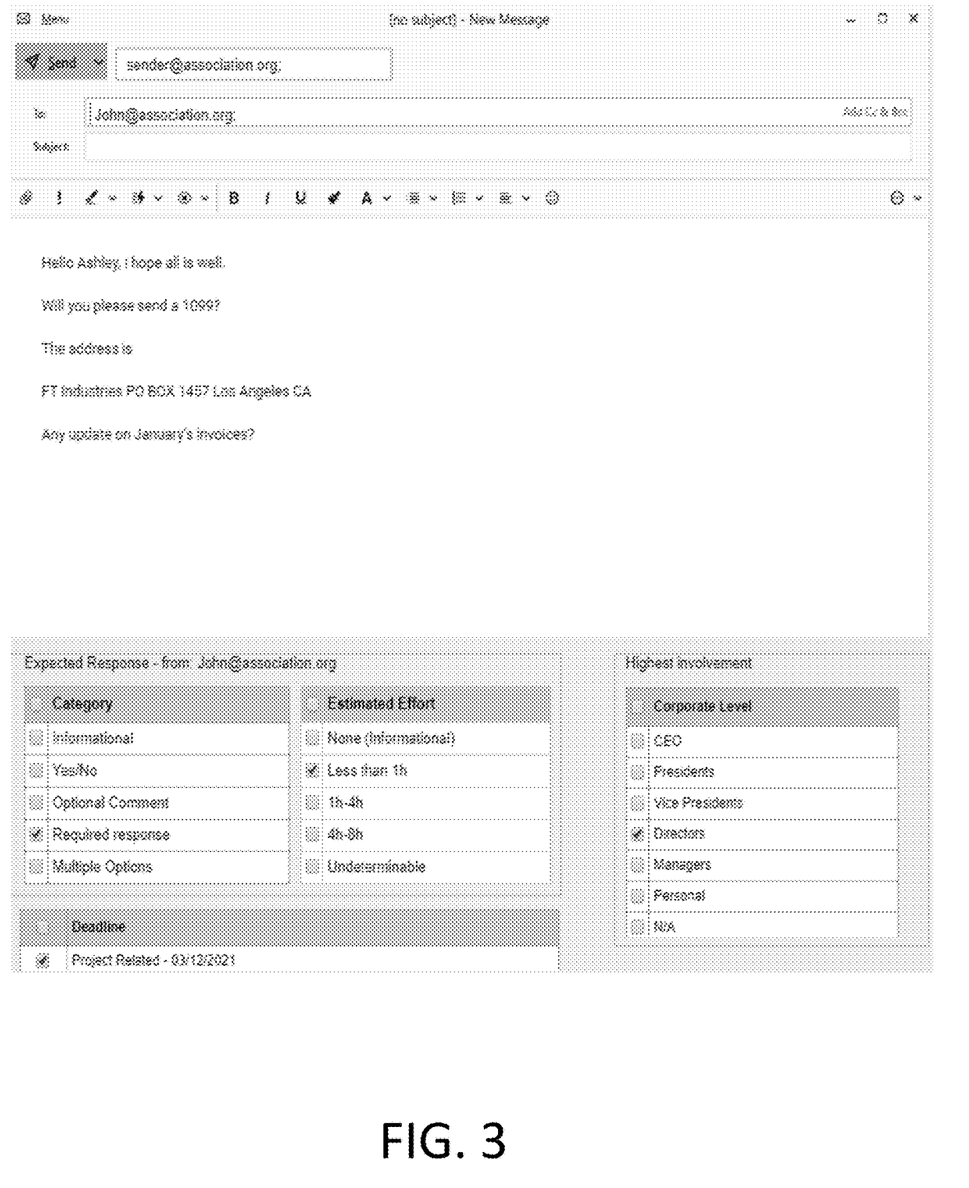
FIG. 3 shows a first example of a sender's user interface including an email message in accordance with the exemplary embodiment.

In reference to FIG. 3, a composite dataset of the email system 1 is obtained by combining the standard email dataset 122 with the supplementary email dataset 124. When any member of the organization sends a non-informational email, the expected response module 142 requires the member to select for each recipient information in relevant data fields displayed on the member's user interface. The data fields include a category of the email, an estimate of the effort required on the part of the recipient to respond to the email, a deadline, and a corporate level of the email.

When any member of the organization sends an informational email, the expected response module 142 requires the member to select for each recipient all of the aforementioned fields with the exception of the estimate of the recipient's effort. The estimate of the recipient's effort field is precalculated by the expected response module 142 based on the length of the email, and is automatically pre-filled into the field.

As seen in the illustrated embodiment, every outgoing email message to members of the same organization includes the following required supplementary email dataset 124: Category of the expected response, Estimated Effort required of the recipient, message related Deadline, and Corporate Level involvement. In the email display, fields of the supplementary email dataset 124 contain checkbox options, and the desired options are selected for each recipient by the sender. In the illustrated embodiment, the Category, Estimated Effort and Deadline items form part of an Expected Response section of the sender's display, and the Corporate Level item is the sole part of a Highest Involvement section of the sender's display.

In detail, the Category of the expected response requires the sender to choose one of the following five options: Informational, Yes/No, Optional Comment, Required Response, and Multiple Options.

Figure 4:
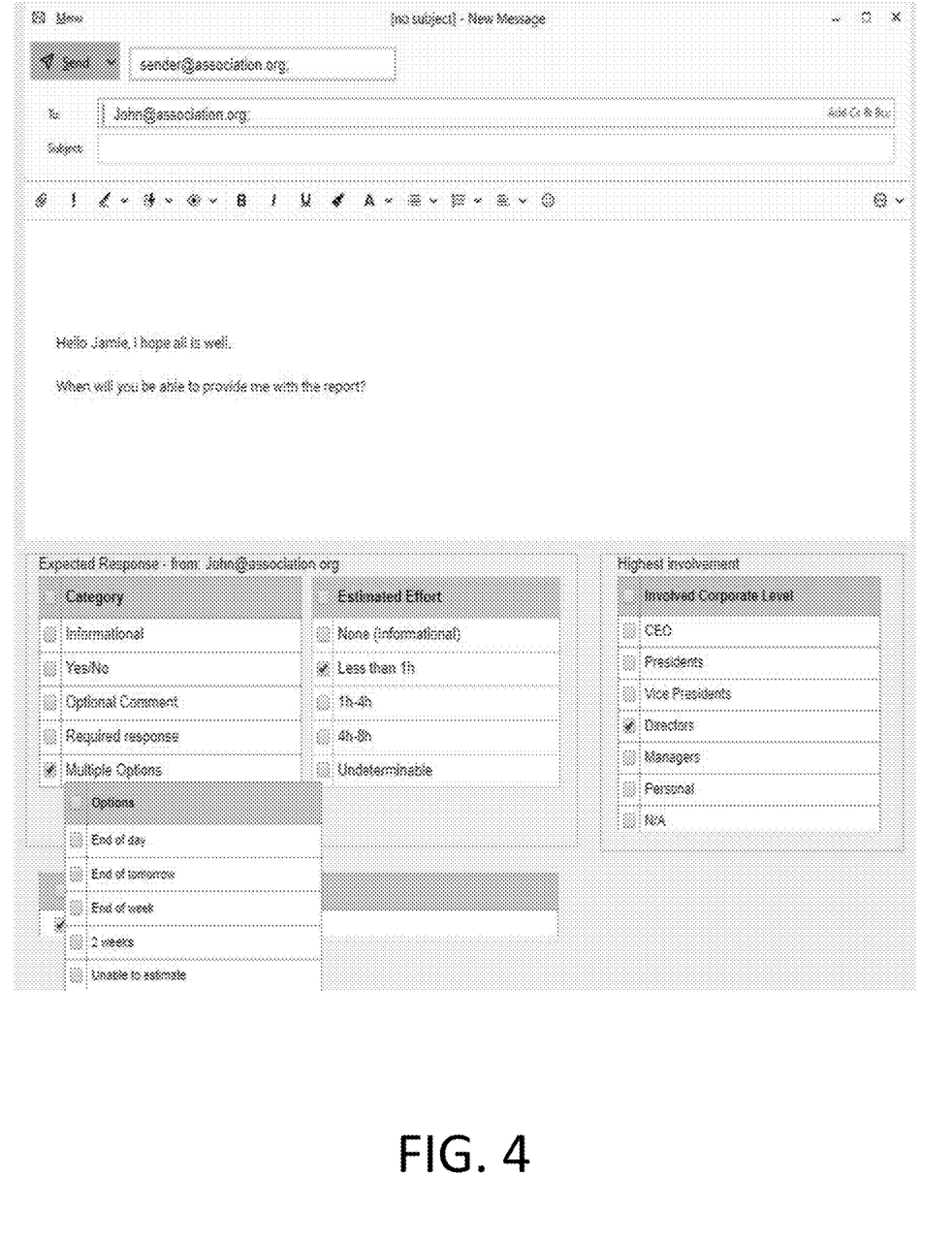
FIG. 4 shows a second example of a sender's user interface including an email message in accordance with the exemplary embodiment.

Referring also to FIG. 4, this is similar to FIG. 3. The main difference is: the sender has selected the Multiple Options category. The Multiple Options category, when selected, provides a dropdown menu of predetermined options relating to when the recipient will be able to respond to the email. There can be up to 99 predetermined options available for the dropdown menu. The sender can customize which of these options will be offered to the recipient. In the illustrated embodiment, there are five options chosen by the sender to present to the recipient. That is, the sender does not select (check) any of the options. The recipient selects one of the options when responding to the email.

The Estimated Effort required of the recipient provides, by default, five options. The options are time period options, and the sender must select one of them. The options are: None (informational), Less than 1 h (hour), 1h-4h (hours), 4h-8h, and Undeterminable.

Figure 5:
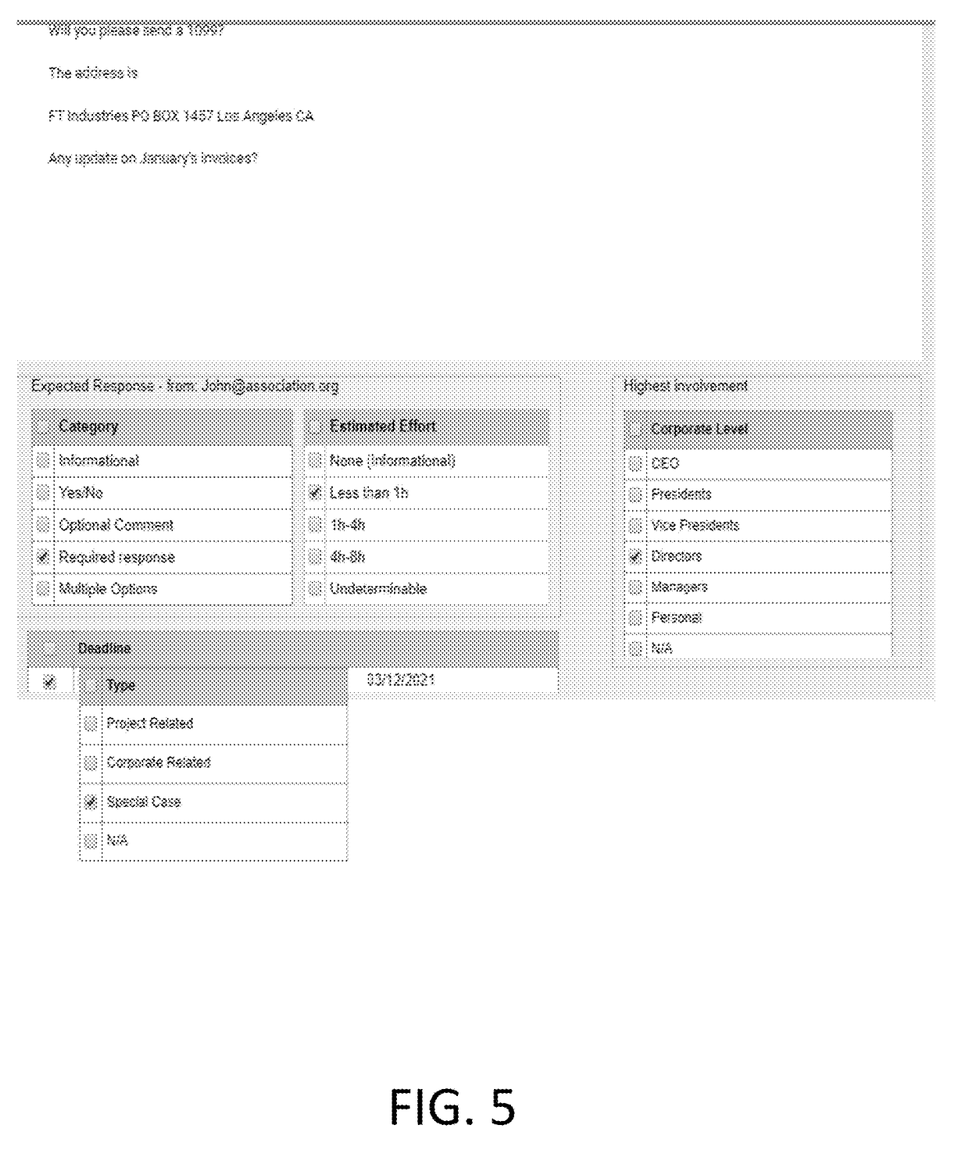
FIG. 5 shows a third example of a sender's user interface including an email message in accordance with the exemplary embodiment.

Referring also to FIG. 5, the Deadline field automatically provides the sender with a menu of a Type of deadline. The menu includes four options: Project Related, Corporate Related, Special Case, and N/A. The sender is required to select one of these options. The Deadline field also gives the sender the option of manually entering a deadline date and/or time.

The Corporate Level dataset requires the sender to select one of the following seven options: CEO, Presidents, Vice Presidents, Directors, Managers, Personal, or N/A.

The administration module 16 allows customization of the Expected Response and Highest Involvement sections, for example by adding, removing or updating the existing options and values. This can be done by an email system administrator according to the needs and requirements of the organization.

Overall, selecting the required options and entering information into the data fields requires minimal investment of effort and time on the part of the sender, due to the multiple-option checkbox interface.

Figure 6:
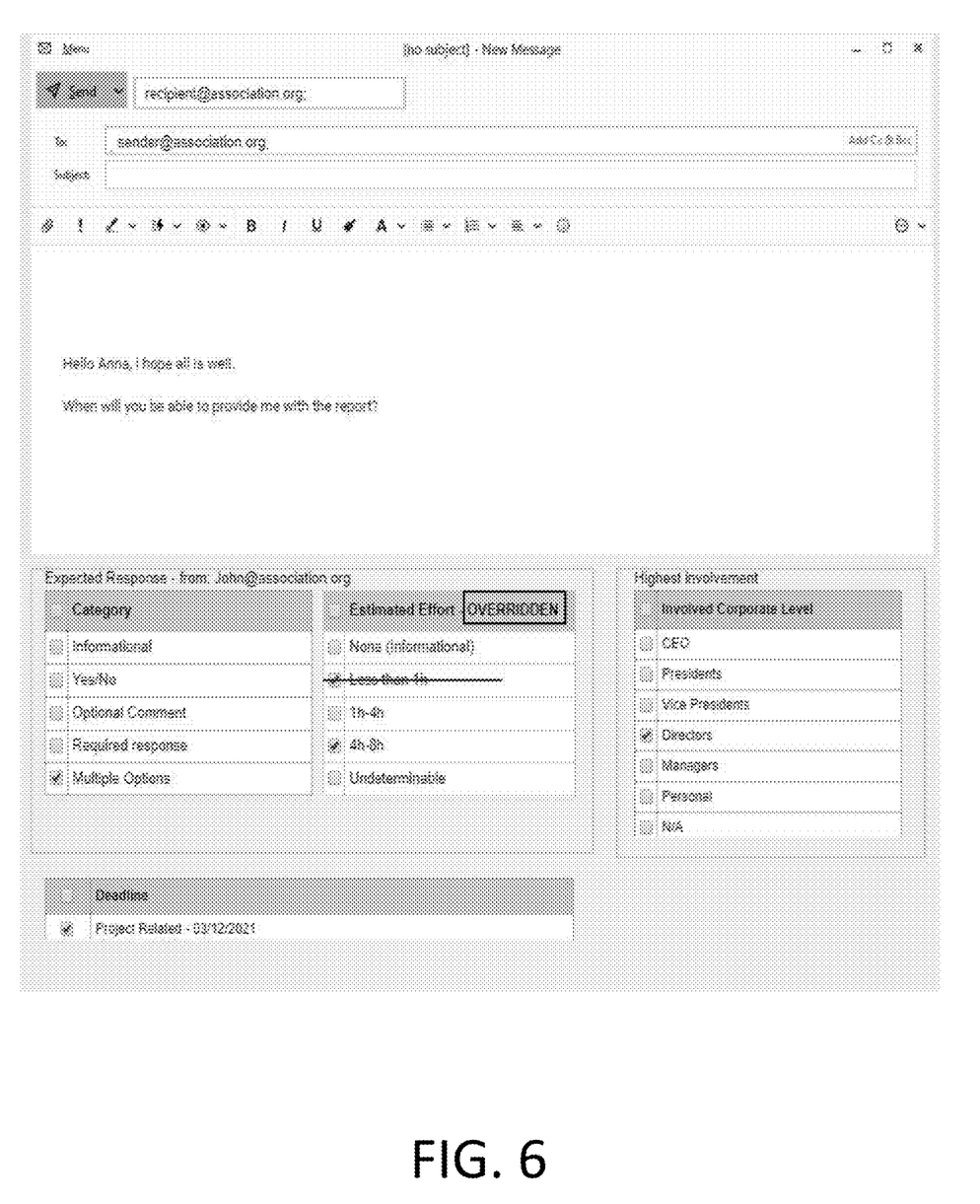
FIG. 6 shows an example of a recipient's user interface including an email message in accordance with the exemplary embodiment.

In reference to FIG. 6, a recipient responding to an email can override the sender's estimated effort selection. Furthermore, a recipient responding to an email becomes a new sender, and when sending a response selects an item in the Estimated Effort field. The selection quantifies the estimated effort required for the response to the new sender's responding email.

Figure 7:
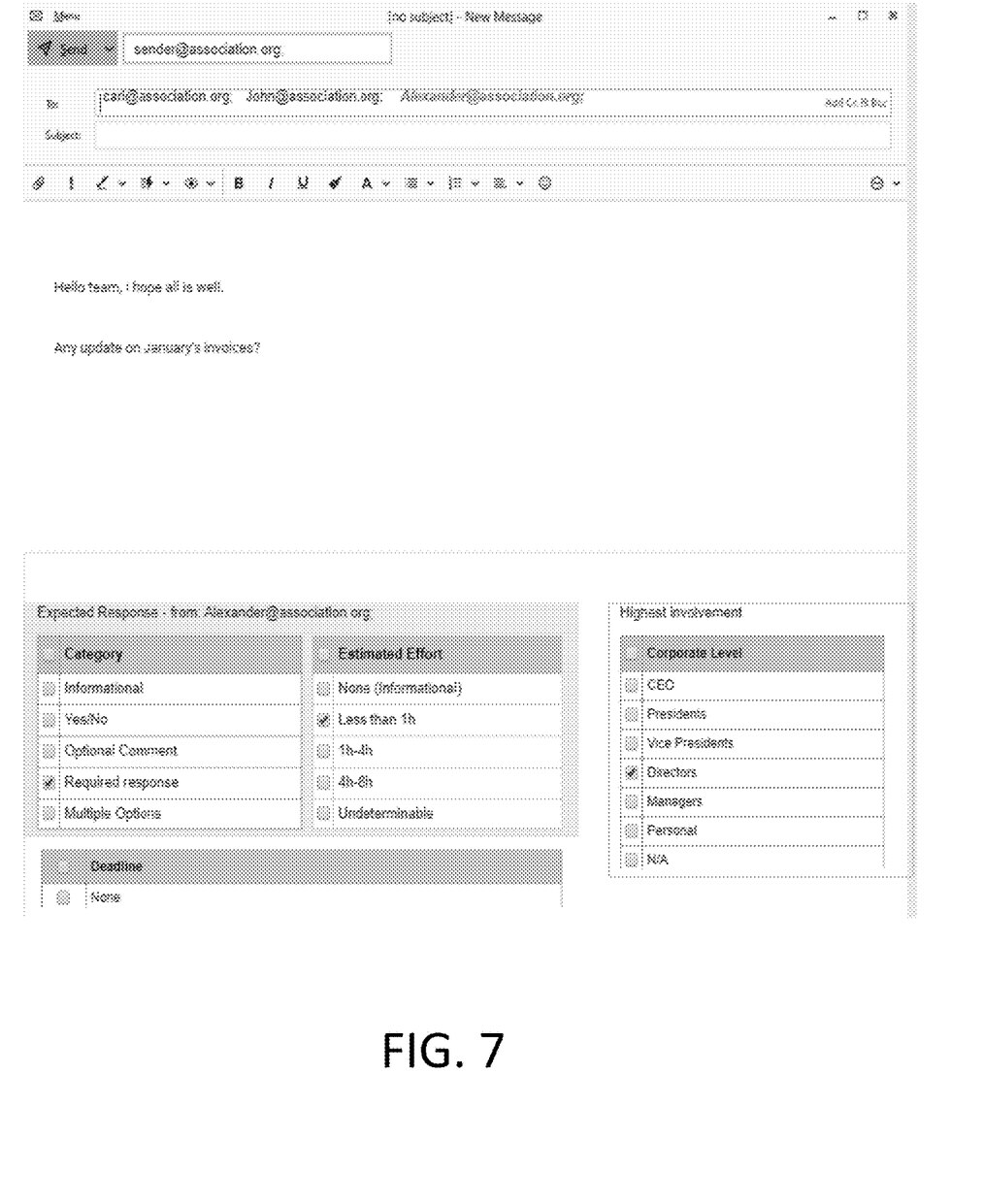
FIG. 7 shows a fourth example of a sender's user interface including an email message in accordance with the exemplary embodiment.

In another embodiment, as shown in FIG. 7, a sender can choose multiple recipients for a same message. By default, the expected response module 142 allocates the whole effort among all the recipients of the message in equal shares to the individual recipients. The sender can manually override the default allocation, and allocate shares of the whole effort to the individual recipients according to specific percentages. That is, the sender specifies the recipient's estimated effort for each individual recipient. In the illustration, only the details for the third of three recipients are shown. If a recipient is merely a recipient as a Cc or as a Bcc, the expected response module 142 automatically marks the Category of the Expected Response of such recipient as informational, with an automatic Estimated Effort calculated according to a formula based on the message's number of words.

The email system 1 does not require estimated recipient's effort information for recipients external to the organization. When sending an email to a recipient outside the organization, either as a new email or as a reply, the supplementary email dataset 124 is not used. Information of the supplementary email dataset 124 is hidden in the sender's user interface by the expected response module 142, and the message is sent as a standard email message.

Aspects of the streamlining module 144 will now be described in detail.

As described above, the email system 1 requires senders to provide additional information in a supplementary email dataset 124. The streamlining module 144 collects the supplementary email dataset 124 from each outgoing email. The streamlining module 144 then employs algorithms. The algorithms aggregate the data of all the unread emails belonging to a given recipient, and construct a real-time email inbox dashboard for the recipient. That is, the streamlining module 144 leverages the supplementary email dataset 124 and creates the dashboard. The dashboard shows a streamlined comprehensive summary of all emails in the recipient's inbox. The dashboard allows the recipient to, at a glance, potentially postpone the process of addressing individual emails to a later time. This can free up the recipient's time and resources, and enable them to immediately return their focus to their primary ongoing task. Thereby, the recipient's work productivity can be maximized.

Figure 8:
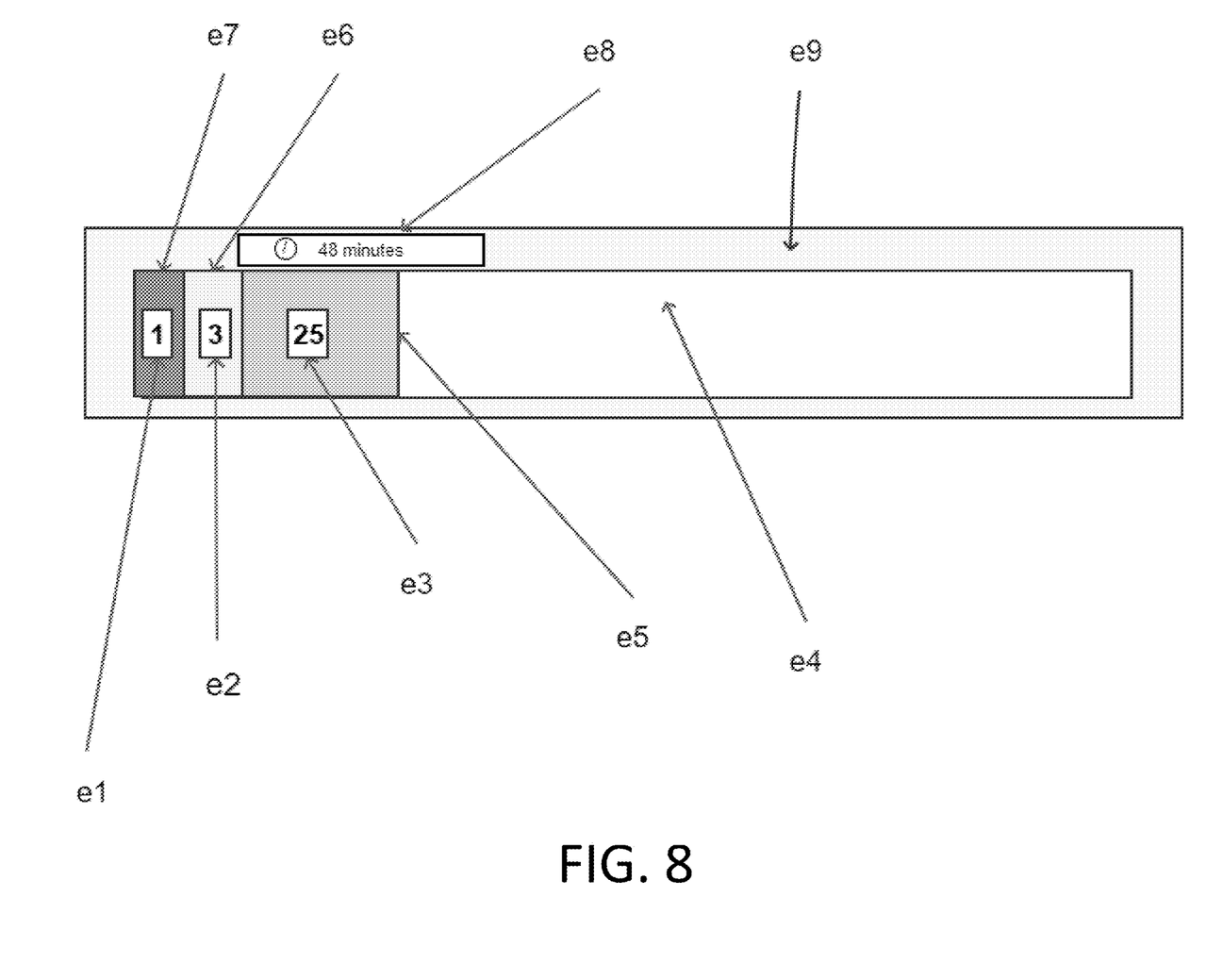
FIG. 8 shows a first example of a recipient's user interface including an initial dashboard displayed when the recipient decides to check the status of his/her incoming emails, in accordance with the exemplary embodiment.

In reference to FIG. 8, this shows a first example of a recipient's initial dashboard displayed when the recipient decides to check the status of his/her incoming emails. The dashboard shows: e1, a number of high priority emails requiring the recipient's immediate attention; e2, a number of medium priority emails requiring the recipient's attention; e3, a number of low priority emails requiring the recipient's attention; e4, the recipient's remaining work capacity; e5, an area representing the relative number of low-priority emails; e6, an area representing the relative number of medium-priority emails; e7, an area representing the relative number of high-priority emails; e8, the total estimated time required for the user to deal with every email message; and e9, a peripheral area representing the overall status of the email queue.

In the present embodiment, the recipient's remaining work capacity (e4) is obtained as follows. The database 12 stores a predefined total work capacity of the recipient expressed as a number of emails. The streamlining module 144 subtracts from the total work capacity the total of all the high (e1), medium (e2) and low (e3) priority emails. The result is the recipient's remaining work capacity (e4).

The above-described areas of the recipient's dashboard can be color coded for easier reference. For example, area e5 can be green, area e6 can be yellow, and area e7 can be red. Area e9 can have a changeable color. For example, when area e9 is green, the user's attention can be delayed to a later time. When area e9 is yellow, this may be due to a high priority message that has a near deadline, or may be due to a request by an executive user. When area e9 is red, this may be due to any of a number of exigencies (see below). In the example of FIG. 7, area e9 is yellow (color not shown).

The streamlining module 144 determines automatically whether any and how many emails contain deadline-related data, whereby each such email is in need of immediate attention. The streamlining module 144 also determines automatically if, and for how long, a recipient could postpone the process of checking their email inbox. Both these determinations are factors in calculating the overall color of the peripheral area e9: green, yellow, or red.

Figure 9:
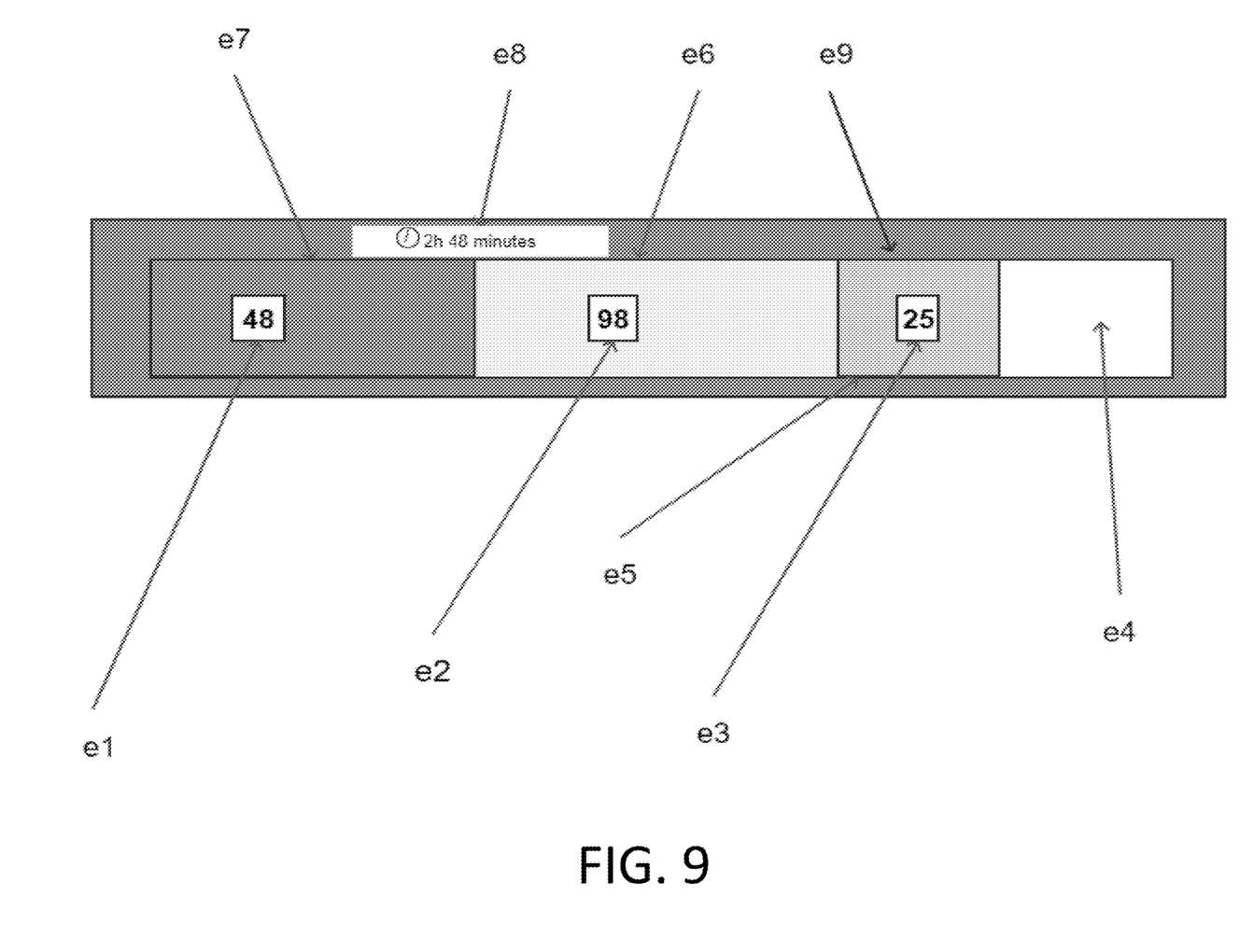
FIG. 9 is similar to FIG. 8, but shows a second example of a recipient's user interface including an initial dashboard displayed when the recipient decides to check the status of his/her incoming emails, in accordance with the exemplary embodiment.

In reference to FIG. 9, this shows a second example of a recipient's exemplary initial dashboard. The dashboard is similar to the one of FIG. 8, but shows a different situation or scenario. In particular, in area e8, the total estimated time required for the user to deal with every email message is different. Furthermore, area e9, representing the overall status of the email queue, presents a red color (color not shown in FIG. 9). The red color indicates that urgent attention is needed. For example, the urgency may be due to a large number of high-priority messages that have close deadlines, or may be due to multiple requests by executive users, or may be due to the total estimated time for the user to deal with every email message being over two hours. In the illustration, the red color urgency is due to either or both of: forty-eight high-priority messages that have close deadlines, and the total estimated time for the user to deal with every email message being over two hours.

Figure 10:
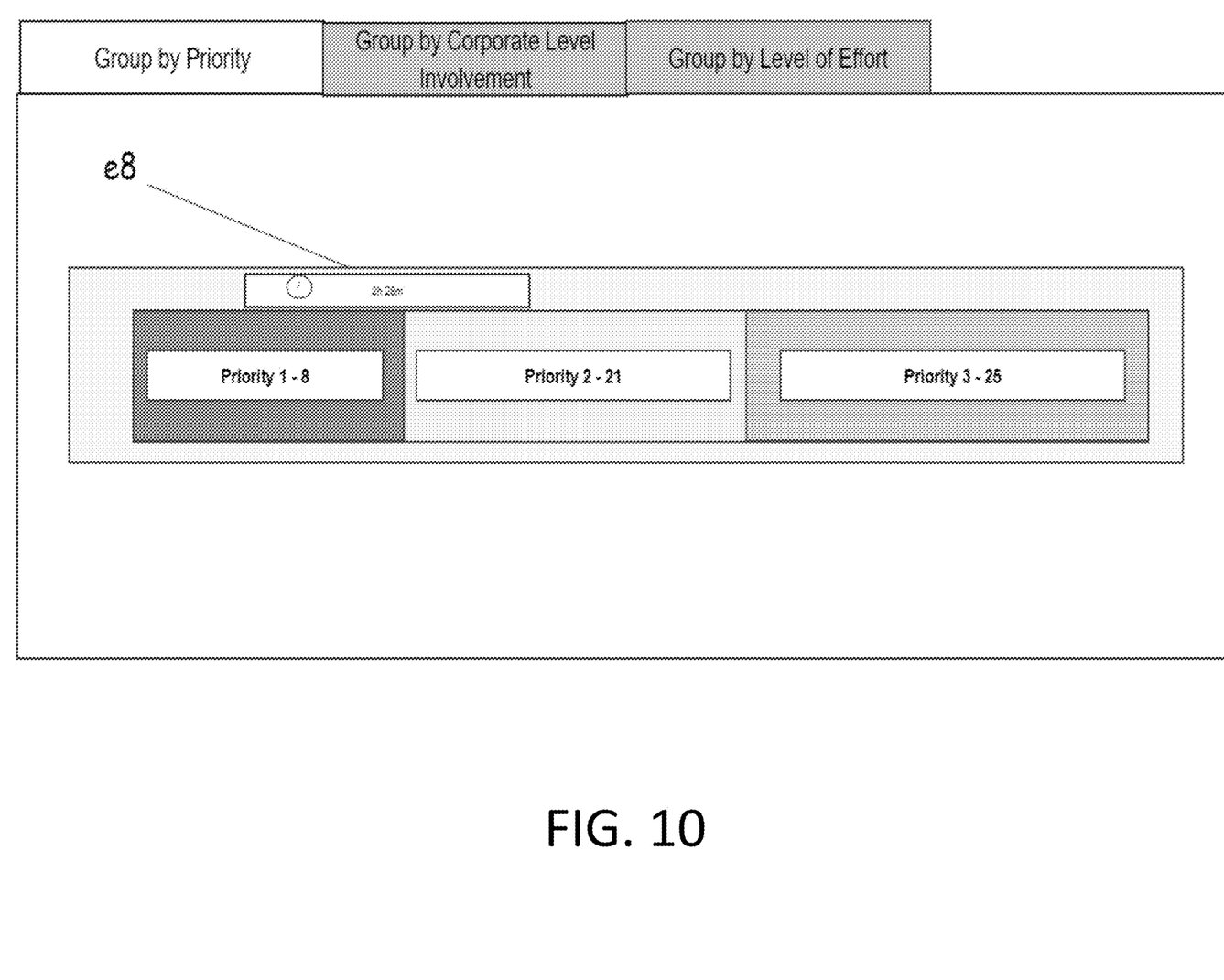
FIG. 10 shows a first example of a recipient's user interface including an exemplary grouping dashboard, selected by the recipient after he/she has viewed an initial dashboard.
Figure 11:
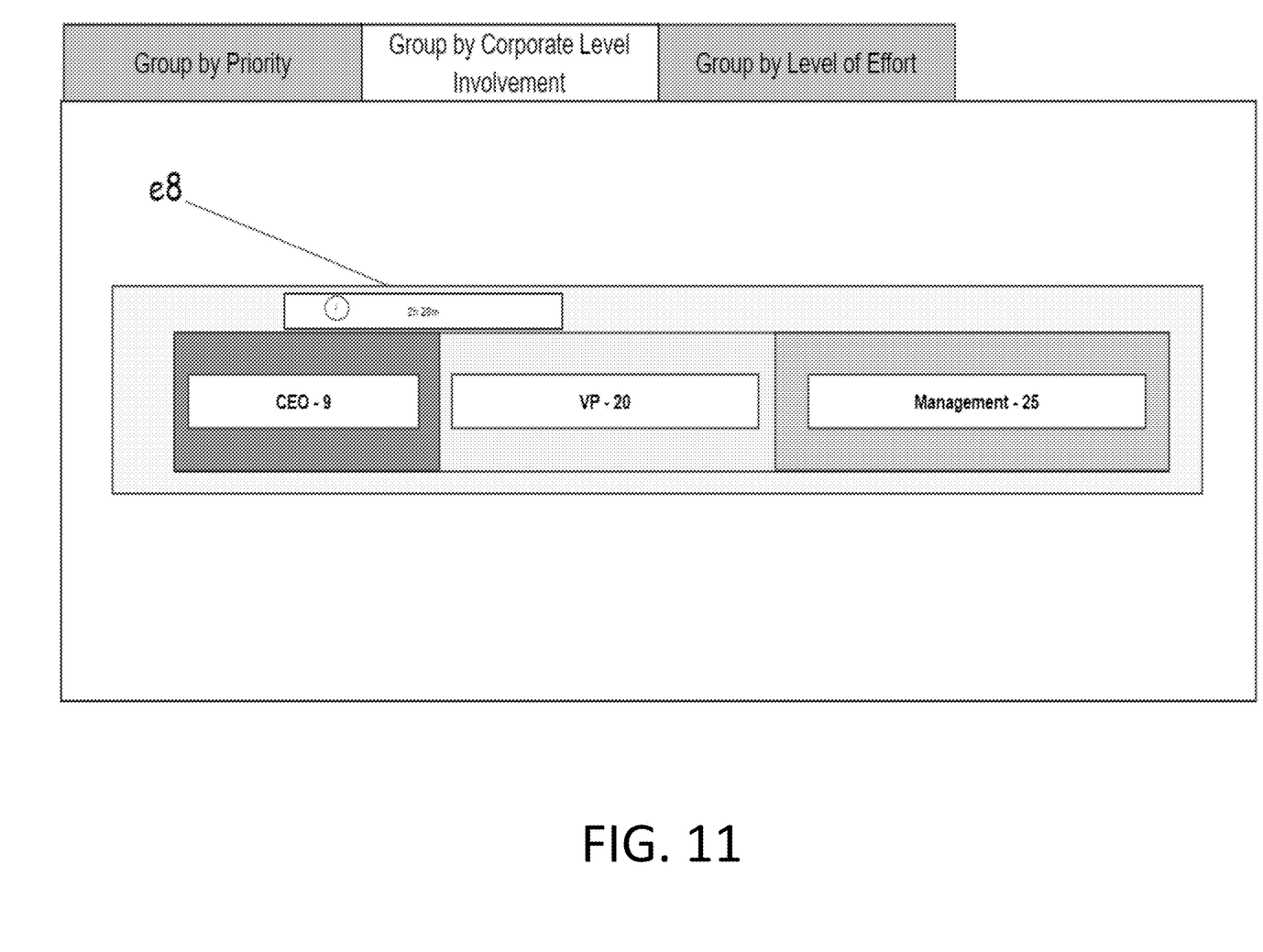
FIG. 11 shows a second example of a recipient's user interface including an exemplary grouping dashboard, selected by the recipient after he/she has viewed an initial dashboard.
Figure 12:
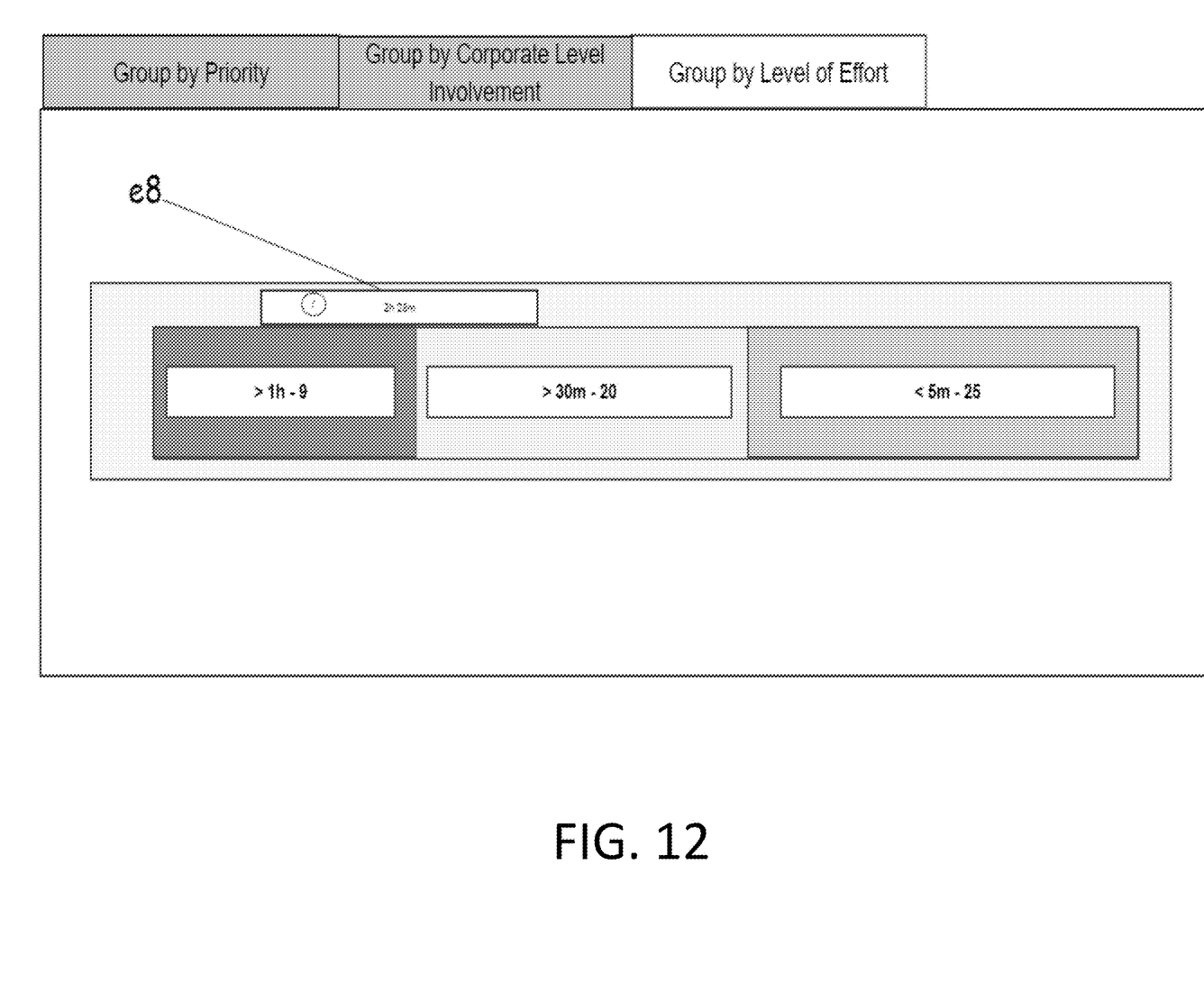
FIG. 12 shows a third example of a recipient's user interface including an exemplary grouping dashboard, selected by the recipient after he/she has viewed an initial dashboard.

In reference to FIGS. 10-12, these show examples of a recipient's exemplary grouping dashboard, selected by the recipient after he/she has viewed an initial dashboard (see above). The grouping dashboard shows areas representing groups of incoming emails with similar characteristics. For example, FIG. 10 shows areas for three groups of emails, wherein the emails in each group are of a similar priority level (PL). A first group has emails with a level 1 PL. A second group has emails with a level 2 PL. A third group has emails with a level 3 PL. In the illustration, the first group has 8 emails, the second group has 21 emails, and the third group has 25 emails. That is, the total number of incoming emails of the recipient is 54. The three groups are arranged in sequence from left to right, with the first group at the left end and the third group at the right end. In addition, the areas can be color coded for easier reference. For example, the first group can be red, the second group can be yellow, and the third group can be green. In addition, as seen, the area e9 is also displayed on each grouping dashboard.

FIG. 11 shows areas for three groups of emails, wherein the emails in each group are of a similar corporate level involvement (CLI). A first group has emails with a CEO CLI. A second group has emails with a VP (Vice Presidents) CLI. A third group has emails with a Managers CLI. In the illustration, the first group has 9 emails, the second group has 20 emails, and the third group has 25 emails. That is, the total number of incoming emails of the recipient is 54. The three groups are arranged in sequence from left to right, with the first group at the left end and the third group at the right end. In addition, the areas can be color coded for easier reference. For example, the first group can be red, the second group can be yellow, and the third group can be green.

FIG. 12 shows areas for three groups of emails, wherein the emails in each group are of a similar level of effort (LOE). A first group has emails with an LOE in the range of more than one hour. A second group has emails with an LOE in the range of more than 30 minutes up to one hour. A third group has emails with an LOE in the range of less than 5 minutes. (In this description, it is assumed that the streamlining module 144 has been configured to distribute emails with an LOE of 5-30 minutes to either the second group or the third group.) In the illustration, the first group has 9 emails, the second group has 20 emails, and the third group has 25 emails. That is, the total number of incoming emails of the recipient is 54. The three groups are arranged in sequence from left to right, with the first group at the left end and the third group at the right end. In addition, the areas can be color coded for easier reference. For example, the first group can be red, the second group can be yellow, and the third group can be green.

Once a user has viewed his/her initial dashboard and decides to process his/her email inbox, he/she can call up the display of grouping areas onto the dashboard. In the present embodiment, the default display is that of the priority level groups; i.e., Group by Priority (FIG. 10). By clicking on the appropriate tab of this display, the user can obtain the display of Group by Corporate Level Involvement (FIG. 11), or the display of Group by Level of Effort (FIG. 12). Clicking on a particular area of any grouping dashboard immediately takes the user to a list of the emails belonging to that specific group.

Aspects of the alert module 146 will now be described in detail.

The administration module 16 allows a user to set a specific alert threshold, for each recipient, for the total estimated time required for the recipient to deal with every email message. For instance, the alert threshold may be set as 8 hours. This alert threshold is stored in the alert module 146. The alert module 146 is programmed to constantly compare in real time the alert threshold value to the recipient's actual current estimated time required to deal with every email message. If the current value exceeds the alert threshold value, the alert module 146 generates an alert, and transmits the alert to the sending and receiving module 18.

The sending and receiving module 18 transmits the alert simultaneously to all electronic devices assigned to the recipient. Such devices may include for example a desktop computer and a mobile device. The mobile device may be a smart phone, a smart watch, or a tablet, etc. Thus the recipient can become immediately aware of the alert, no matter where in the organization he may be physically located at that time. The recipient can then choose to either snooze the alert or simply turn it off. In addition, the alert module 144 can be programmed to repeatedly issue the alert. In such case, the email system 1 can be configured so that the alert cannot be turned off until the recipient starts working on their inbox.

Aspects of the effort management module 148 will now be described in detail.

The effort management module 148 obtains from the streamlining module 144 information on what degree of effort, in terms of total hours, is necessary to address every unopened email in someone's inbox. Alternatively, the effort management module 148 can itself determine automatically such degree of effort.

The effort management module 148 can also be configured to combine the estimate of the recipient's effort with other captured data elements such as characteristics of the recipient's actual response to each email. For example, the number of words in an email response, the number of letters (and characters) in the response, or the number of paragraphs in the response.

As described above, the expected response module 142 allows a recipient to override the sender's selection of the estimated recipient effort. Each override when selected is recorded by the effort management module 148 as a misalignment, and is marked for further review by a dedicated committee in the organization for example. The committee can, on a regular basis, review misalignment reports. As a result, recurrent outliers can be identified, interviewed and retrained, to minimize future misalignments.

The effort management module 148 processes all supplementary email datasets 124 and standard email datasets 122, and calculates the cumulative level of effort required by each sender from all of his/her recipients during a given period. That is, the effort management module 148 calculates how much overall organization time is requested by a given sender from all his/her recipients during a given time frame to get all his/her outgoing emails attended to. In addition, the effort management module 148 can produce real-time and historical reports of the estimated amount of the organization's user time spent in an email system. All these statistics are then made available at the team level, the department level, and the organization level. This allows understanding of how much of the organization's resources are spent at the organization level, the department level, the team level and the individual level.

Figure 13:
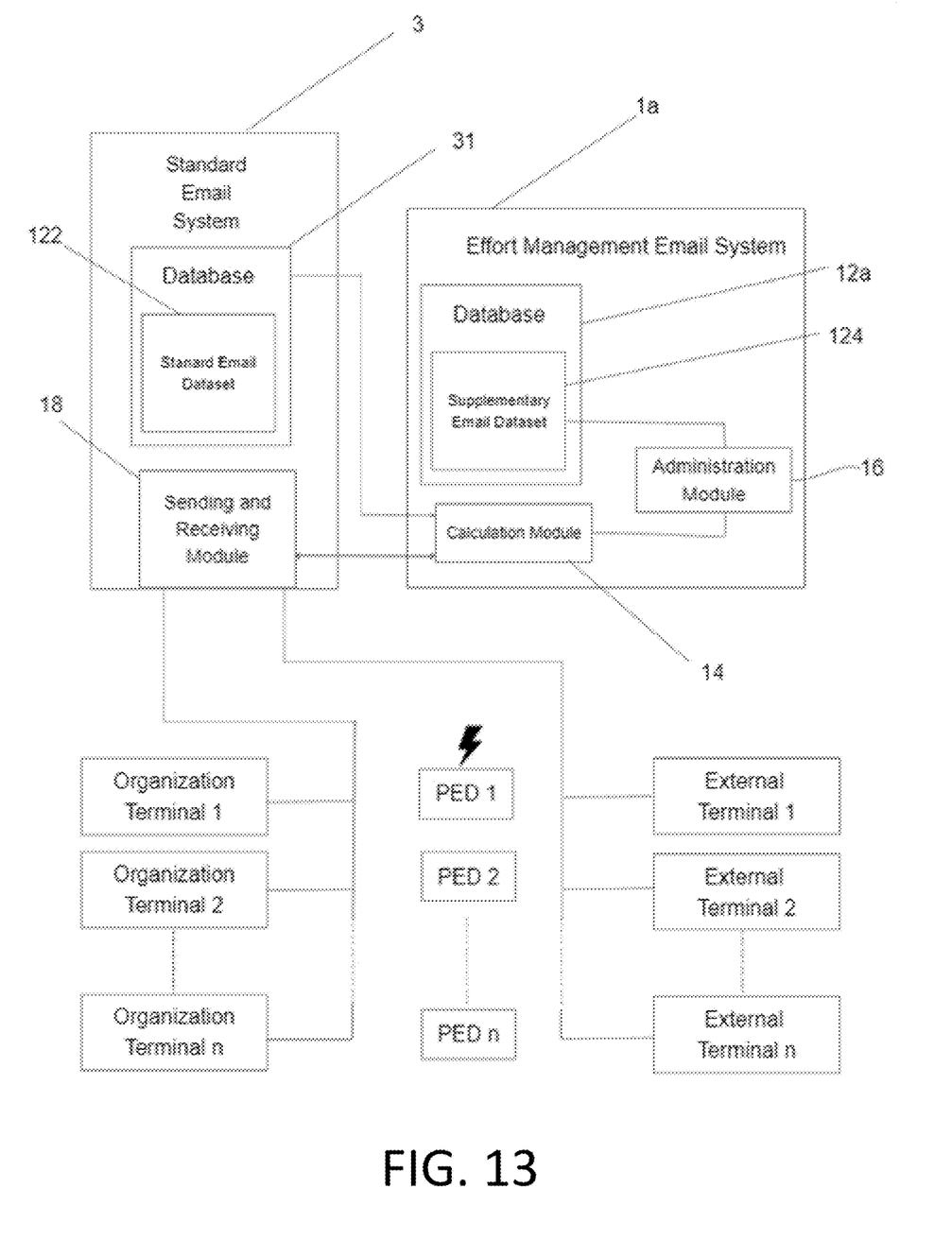
FIG. 13 is a schematic diagram of an effort management email system according to an alternative embodiment of the present invention, showing a plug-in implementation of the email system.

In reference to FIG. 13, an exemplary effort management email system 1a similar to the exemplary email system 1 can be installed as a plug-in to an existing standard email system 3. The email system 1a includes a database 12a, a calculation module 14, and an administration module 16. The database 12a includes a supplementary email dataset 124. The standard email system 3 includes a database 31, and a sending and receiving module 18. The database 31 includes a standard email dataset 122. The calculation module 14 of the email system 1a can communicate with the database 12a of the standard email system 3, and with the sending and receiving module 18 of the standard email system 3.

In summary of the exemplary email system 1, by incorporating the supplementary email dataset 124 directly into a sender's email, the email system 1 allows recipients to conveniently and quickly assess whether they must immediately attend to any incoming email or can delay incoming email processing to a later time. In addition, the email system 1 automatically sorts emails by prioritizing the ones that truly need the recipient's immediate attention, or the ones required by key organizational members, or the ones requiring a similar level of effort. This can maximize the productivity of employees and all staff. The email system 1 also measures and maximizes the efficiency and effectiveness of departments and indeed the entire organization in communicating via email.

As will be recognized by those skilled in the art, the innovative concepts described and shown herein can be modified and varied over a wide range of applications. Accordingly, the scope of patented subject matter is not to be limited by any of the specific exemplary teachings given. The present invention is intended to embrace all alternatives, modifications and variations that fall within the spirit and broad scope of the appended claims.

None of the description in the present application should be read as implying that any particular element, step, or function is an essential element which must be included in the claim scope. The scope of patented subject matter is defined only by the claims and their equivalents. Moreover, none of the claims are intended to invoke 35 USC 112(f) unless the exact words "means for" are followed by a participle.

The claims as filed are intended to be as comprehensive as possible, and no subject matter is intentionally relinquished, dedicated, or abandoned.

The invention claimed is:

1. An email system for managing email system users' effort, comprising:
  a processor, a memory, a database comprising a supplementary email dataset, wherein the supplementary email dataset comprises information on the amount of time any recipient of any given email must spend in dealing with the email, wherein the amount of time comprises predetermined ranges of periods of time; and a calculation module configured for processing the supplementary email dataset and compiling user interface email displays for senders of emails based on the supplementary email dataset, wherein the calculation module comprises:

an expected response module structured and arranged for processing the supplementary email dataset, and compiling user interface email displays for senders of emails based on the supplementary email dataset;

a streamlining module structured and arranged for organizing information on the incoming emails of individual recipients, and compiling user interface displays for the individual recipients based on the information on the incoming emails; an alert module structured and arranged for storing a predetermined alert threshold value of the total estimated time required for each recipient to deal with every incoming email message not yet dealt with by the recipient, analyzing incoming emails of each recipient to determine a current value of the total estimated time required for the recipient to deal with every incoming email message not yet dealt with, comparing the alert threshold value with the current value, and generating an alarm when the current value exceeds the alert threshold value; and an effort management module structured and arranged for recording, compiling and analyzing information on emails of any and all of the senders and any and all of the recipients, wherein the streamlining module is further configured for determining an overall status of an incoming email queue of the recipient, the determination is based on predetermined criteria applied to the information on the incoming emails, and the determined overall status is one member of a predefined group of overall statuses for incoming email queues; and wherein the summary of the real-time email inbox dashboard further comprises a colored area representing the determined overall status, the color of the colored area is one member of a predefined group of colors, each of the colors corresponding to a respective overall status of the group of overall statuses, and the color displayed in the colored area is the color of the determined overall status.

2. The email system of claim 1, wherein the calculation module comprises: an expected response module configured for the processing of the supplementary email dataset and the compiling of the user interface email displays for senders of emails based on the supplementary email dataset; and a streamlining module configured organizing information on incoming emails of individual recipients, and compiling user interface displays for the individual recipients based on the information on the incoming emails.

3. The email system of claim 2, wherein the calculation module further comprises: an effort management module configured for recording, compiling and analyzing information on emails of any and all of the senders and any and all of the recipients.

4. The email system of claim 3, wherein the calculation module further comprises: an alert module configured for storing a predetermined alert threshold value of the total estimated time required for each recipient to deal with every incoming email message not yet dealt with by the recipient, analyzing incoming emails of each recipient to determine a current value of the total estimated time required for the recipient to deal with every incoming email message not yet dealt with, comparing the alert threshold value with the current value, and generating an alarm when the current value exceeds the alert threshold value.

5. The email system of claim 4, further comprising an administration module, wherein the administration module is configured for customizing the content of the supplementary email dataset, and customizing the functions of the calculation module.

6. The email system of claim 2, wherein the user interface displays compiled by the streamlining module comprise for any given recipient a real-time email inbox dashboard showing a summary of all emails in the recipient's inbox not yet attended to by the recipient.

7. The email system of claim 6, wherein the summary comprises a number of high priority emails requiring the recipient's attention, a number of medium priority emails requiring the recipient's attention, and a number of low priority emails requiring the recipient's attention.

8. The email system of claim 7, wherein the summary further comprises a total estimated time required for the user to deal with every email message.

9. The email system of claim 6, wherein the user interface displays compiled by the streamlining module further comprise for any given recipient a grouping dashboard showing a summary of the incoming emails grouped into a plurality of predetermined groups, and the emails of each group have similar characteristics.

10. The email system of claim 9, wherein the plurality of groups comprise groups selected from the set consisting of: groups each having a predetermined level of priority, groups each having a predetermined level of corporate involvement, and groups each having a predetermined level of effort.

11. The email system of claim 3, wherein the database further comprises a standard email dataset.

12. The email system of claim 11, wherein the effort management module is further configured for generating reports based on the recorded, compiled and analyzed information.

13. The email system of claim 3, further comprising a sending and receiving module configured for electronically communicating with a plurality of electronic devices including a plurality of computer terminals.

14. The email system of claim 1, wherein the supplementary email dataset further comprises information on a corporate level involvement of any given email, wherein the corporate level involvement information comprises a plurality of predetermined positions of members of a corporation.

15. The email system of claim 14, wherein the supplementary email dataset further comprises information on a deadline of any given email, wherein the deadline information comprises a plurality of predetermined points in time in the future.

16. The email system of claim 15, wherein the supplementary email dataset further comprises information on a category of any given email, wherein the category information comprises a plurality of predetermined category types.

17. The email system of claim 1, wherein the user interface displays compiled by the streamlining module comprise for any given recipient a real-time email inbox dashboard showing a summary of all emails in the recipient's inbox not yet attended to by the recipient.

* * * * *